(12) United States Patent
Parkvall et al.

(10) Patent No.: US 9,236,938 B2
(45) Date of Patent: Jan. 12, 2016

(54) RESOURCE ALLOCATION FOR CO-EXISTING NETWORKS

(75) Inventors: Stefan Parkvall, Stockholm (SE); Erik Dahlman, Bromma (SE); Walter Müller, Upplands Vasby (SE); Göran Rune, Linkoping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1507 days.

(21) Appl. No.: 12/307,763

(22) PCT Filed: Jul. 4, 2007

(86) PCT No.: PCT/SE2007/050495
§ 371 (c)(1),
(2), (4) Date: Mar. 12, 2009

(87) PCT Pub. No.: WO2008/004973
PCT Pub. Date: Jan. 10, 2008

(65) Prior Publication Data
US 2009/0207815 A1    Aug. 20, 2009

(30) Foreign Application Priority Data

Jul. 7, 2006    (SE) ...................................... 0601532

(51) Int. Cl.
| | |
|---|---|
| H04J 3/00 | (2006.01) |
| H04W 4/00 | (2009.01) |
| H04B 7/26 | (2006.01) |
| H04W 36/00 | (2009.01) |
| H04W 72/00 | (2009.01) |
| H04W 72/04 | (2009.01) |
| H04W 72/12 | (2009.01) |

(52) U.S. Cl.
CPC ............. *H04B 7/2656* (2013.01); *H04W 36/00* (2013.01); *H04W 72/00* (2013.01); *H04W 72/04* (2013.01); *H04W 72/12* (2013.01)

(58) Field of Classification Search
CPC ...... H04W 72/12; H04W 36/00; H04B 7/2656
USPC ................................................. 370/329, 336
See application file for complete search history.

(56) References Cited

U.S. PATENT DOCUMENTS

| | | |
|---|---|---|
| 2003/0083095 A1 | 5/2003 | Liang |
| 2003/0156594 A1* | 8/2003 | Trott et al. ................. 370/442 |

(Continued)

FOREIGN PATENT DOCUMENTS

| | | |
|---|---|---|
| GB | 2 369 275 A | 6/2004 |
| WO | 9949587 A1 | 9/1999 |

(Continued)

OTHER PUBLICATIONS

Office Action dated Sep. 13, 2012 from corresponding Chinese Application No. 200780025749.X with English translation, 17 pages.

*Primary Examiner* — Shripal Khajuria
*Assistant Examiner* — Farhad Ali
(74) *Attorney, Agent, or Firm* — Rothwell, Figg, Ernst & Manbeck, P.C.

(57) ABSTRACT

The present invention relates to methods and arrangements for improving the capabilities of an evolved Universal Terrestrial Radio Access Network, in particular for cases when more than one radio access network applying a time-division duplex transmission mode need to co-exist on a same carrier. The invention addresses further problems concerning an efficient allocation of uplink resources and resource allocation in a handover situation. The present invention assigns an attribute in form of a distinguishing value to the time slots used for the uplink and downlink transmission on said carrier such as to avoid scheduling of transmissions via a first radio access network in downlink or uplink time slots assigned to the second radio access network and to avoid scheduling of transmissions via the second radio access network in uplink time slots assigned for transmissions in the first radio access network.

17 Claims, 3 Drawing Sheets

(56) References Cited

U.S. PATENT DOCUMENTS

2003/0176193 A1    9/2003   Konishi et al.
2005/0281230 A1*   12/2005   Beale ............................ 370/335
2007/0081489 A1*   4/2007   Anderson et al. ............. 370/329

FOREIGN PATENT DOCUMENTS

WO    2007005181 A1    1/2007
WO    2007042443 A1    4/2007

* cited by examiner

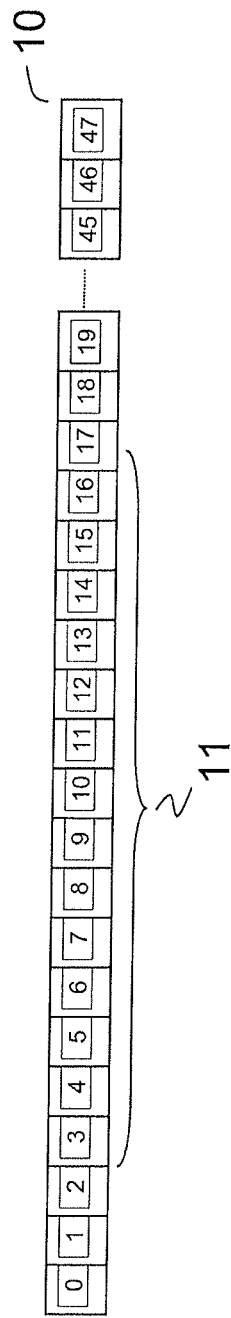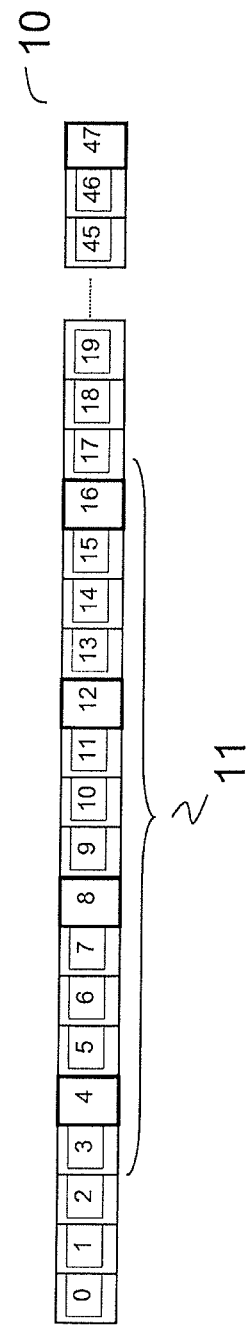

RESOURCE ALLOCATION FOR CO-EXISTING NETWORKS

CROSS REFERENCE TO RELATED APPLICATION

This application is a 35 U.S.C. §371 National Phase Application from PCT/SE2007/050495, filed Jul. 4, 2007, and designating the United States, which claims the benefit of Swedish Patent Application No. 0601532-5, filed Jul. 7, 2006.

TECHNICAL FIELD

The present invention relates to methods and arrangements in a telecommunication system, in particular to improvements in an evolved Universal Terrestrial Radio Access Network (E-UTRAN.

BACKGROUND

The development of E-UTRAN shall ensure competitiveness of future mobile communication systems in a long-term perspective, i.e. 10 years and beyond. The overall target is to further reduce operator and end-user costs and to improve service provisioning. Possible ways of reaching this target are to study ways to achieve reduced latency, to achieve higher user data rates, and improve the system capacity and coverage. One of the main novelties introduced for E-UTRAN in order to achieve these targets is the introduction of a new physical layer. This new physical layer applies Orthogonal Frequency Division Multiplexing (OFDM) for the downlink and Single Carrier Frequency Division Multiple Access (SC-FDMA) for the uplink. These choices were made, e.g., to achieve greater spectrum flexibility and enabling deployment in various spectrum allocations; to achieve the possibility of frequency domain adaptation and enabling higher spectrum efficiency; to achieve enhanced efficiency for broadcast services in the downlink due to the inherent macro-diversity combining properties of OFDM; and to achieve reduced receiver complexity, especially at high bandwidths and in conjunction with MIMO.

An evolved UTRAN can apply either a frequency-division duplex (FDD) transmission mode or a time-division duplex (TDD) transmission mode. When applying the time-division transmission mode, the evolved UTRAN uses the same frequency band for both uplink and downlink communication. Thus, some time slots are reserved for the uplink while others are reserved for the downlink. This is typically configured by the network. One time slot is assigned mandatory for the downlink, e.g. the first time slot in a radio frame. By reading control information in this time slot, the UE then knows the configuration of the other time slots, uplink or downlink.

SUMMARY

The present invention addresses problems that occur when more than one radio access network applying a time-division duplex transmission mode, e.g. UTRAN and E-UTRAN, need to co-exist on a same carrier. The invention addresses further problems concerning an efficient allocation of uplink resources and resource allocation in a handover situation.

It is thus the object of the present invention to improve the capabilities of an evolved Universal Terrestrial Radio Access Network coexisting with a normal Universal Terrestrial Radio Access Network.

It is the basic idea of the present invention to assign an attribute in form of a distinguishing value to the time slots used for the uplink and downlink transmission on said carrier such as to avoid scheduling of transmissions via a first radio access network, e.g. the UTRAN, in downlink or uplink time slots assigned to the second radio access network, e.g. the E-UTRAN, and to avoid scheduling of transmissions via said second radio access network in uplink time slots assigned for transmissions in said first radio access network.

The present invention thus implies the advantage to provide a radio base station node that is capable to handle transmissions of more than one radio access network applying a time-division duplex transmission mode and using a same carrier. Correspondingly, user equipments applying a time-division transmission mode can be used in areas with co-existing radio access networks applying time-divided transmission on a same frequency carrier.

The present invention further implies the advantage of a more efficient resource allocation to user equipments connected to said radio base stations.

BRIEF DESCRIPTION OF THE DRAWINGS

FIGS. 1a and 1b illustrate the present invention according to the second improvement.

DETAILED DESCRIPTION

Figure 2:
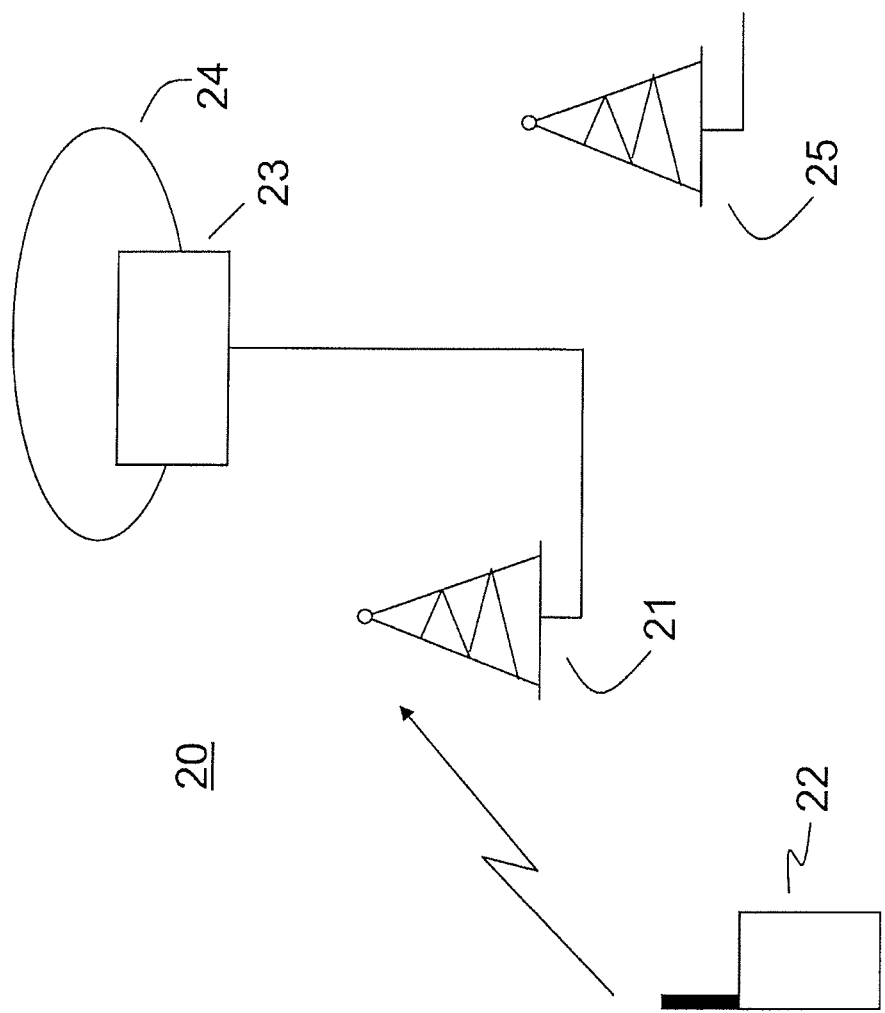
FIG. 2 shows an example communication network within which the present invention can be applied.

FIG. 2 illustrates a part of an E-UTRAN comprising radio base stations 21,25 (or evolved NodeB, eNB) that is connected to a core network 24 via an interface node 23 and provides communication services to user equipments 22. The radio base station 21 can be equipped to also serve in another radio access network, e.g. a UTRAN.

One aspect of the present invention addresses problems when transmissions on an evolved UTRAN and another radio access network, e.g. a UTRAN or "pre-LTE"-system, need to coexist on a same carrier. Transmissions via the UTRAN system shall not be allowed on uplinks assigned to the E-UTRAN. This is obtained by configuring the uplink time slots assigned to the UTRAN only for those instances when an uplink transmission on the UTRAN is supposed to happen. The other time slots are assigned for UTRAN downlink, E-UTRAN uplink, or E-UTRAN downlink. The network can thus avoid scheduling of transmissions via the UTRAN in the downlink time slots of the E-UTRAN. This also applies vice versa, i.e. transmissions via the E-UTRAN do not transmit in uplink time slots assigned to the UTRAN. A terminal that is configured for communication via the UTRAN may listen for the downlink channels also in time slots that are supposed for the downlink of an E-UTRAN. The mobile may thereby, unintentionally, find signaling that relates to the communication on the E-UTRAN and obey to the content of this signaling. Therefore, the present invention introduces an attribute for each time slot carrying distinguishing values. For instance, three values can be applied: 'UL', 'DL', and 'DTX/DRX'. In time slots that are marked as 'DTX/DRX' time slots, the user equipment should not listen to any downlink transmission, nor transmit anything on the uplink.

The same principle of this invention is also applicable for handling synchronous hybrid ARQ (synch HARQ) in the uplink.

With sync HARQ, retransmissions occur at a predefined uplink time slot. If this time slot is used for other purposes, e.g. random access, it should not be configured as uplink time slot for data purposes. However, it should not be configured as downlink time slot either as this would imply that the user equipment is trying to find control signaling. Hence, it is beneficial to separate the indications of uplink and downlink time slots from each other.

Regarding guard times, the principle of this invention might be applied to signal three different subframe types to the user equipment (denoted, e.g., "downlink subframe", "uplink subframe", "inactive subframe") which will be beneficial for the coexistence of a UTRAN with an E-UTRAN. Inactive subframes ensure that user equipments that are designed for communication via the UTRAN do not—by mistake—decode control signaling sent on the downlink of the E-UTRAN.

Further, for synchronous hybrid ARQ it is not always possible to simply "avoid scheduling" as it may be that a sync retransmission takes place. There is therefore a need to signal some kind of information indicating subframes that are available for uplink transmissions to the user equipment. Subframes that are not available for the uplink can be used for the downlink or for random access. The sync HARQ process numbering is done on the UL-available subframes (and may therefore not be an even multiple of the 10 ms radio frame).

Another aspect of the present invention relates to an efficient allocation of transmission resources. A user equipment can, according to one embodiment of the present invention, take into account the presence of certain types of common control (overhead) channels that are known to be transmitted in some subframes. For instance, BCH, PCH, or FACH will be mapped to the first subframe in a radio frame which is known to both the radio base station node and the user equipment. One subframe carries BCH, PCH, and FACH while others do not. Regarding the uplink, some uplink subframes may contain common overhead channels for random access. As a consequence, some subframes can contain more user data than other subframes. Scheduling control signaling is used to indicate which "data resources" a user equipment is supposed to receive. As it is, however, undesirable to have different scheduling control signaling structures in the different subframes, this embodiment of the present invention applies the a-priori knowledge on subframes containing said overhead channels, either predefined (as for the BCH) or semi-statically configured based on BCH information (as for the PCH or FACH). The user equipment, thus, can take this knowledge into account when interpreting the scheduling control signaling both for downlink and uplink scheduling. There is no need for special control signaling for the first subframe and the user equipment accounts for the presence of BCH/PCH/FACH. For instance, FIG. 1a illustrates a series of resource blocks 10 whereof a fraction 11 of said resource blocks, particularly resource blocks 3-14, is assigned to a user equipment by means of control signaling. The user equipment receives and processes the complete fraction of said resource blocks as it knows that no overhead channels use the subframes of said fraction. In the example of FIG. 1b, the user equipment uses all resource blocks of said fraction except for resource blocks 4, 8, 12, and 16 (selected by means of an illustrating example only) as the user equipment can apply a-priori knowledge that the excepted resource blocks are used for overhead control channels.

Uplink transmission resources can, according to one embodiment of the present invention be assigned by means of a scheduling grant controlling the uplink transmission that does not point directly to the resources to use for the uplink transmission but indicates which hopping sequence is to be used. As there is no uplink channel-dependent scheduling in the frequency domain, interference diversity is important together with hopping on, e.g., on a 0.5 ms basis. The uplink resources that are used for transmission can be retrieved from a function taking as an input one or more of, e.g., the following: The resources that are assigned by the scheduler, the connection frame number, the cell-ID, or any other appropriate parameter.

A further embodiment of the present invention relates to resource scheduling for handover access between the radio base station 21 of a source cell and the radio base station 25 of a target cell. After that the radio base station 21 of the source cell has requested handover resources from the radio base station 25 of the target cell, the target cell radio base station 25 allocates resource blocks dedicated to a "handover access", e.g. periodically occurring resource blocks due to the handover request (i.e. the target cell stops using these resource blocks for own user equipments; although the target cell may also allocate the resources to be used by the new entering user equipment 22 after the handover access phase). The target cell radio base station 25 adapts its scheduling (if needed) such as to provide that the allocated handover resources will contribute with little interference and are not allocated to own user equipments and indicates then the allocated handover access resources to the source cell radio base station 21, which in turn indicates the allocated handover access resources to the user equipment 22. After that the user equipment 22 has moved to the target cell and started to use said handover resources, the target cell radio base station 25 can start scheduling the user equipment 22 according to Qos requirements while the allocated handover resource blocks can be utilized again as normal resource blocks.

Figure 3:
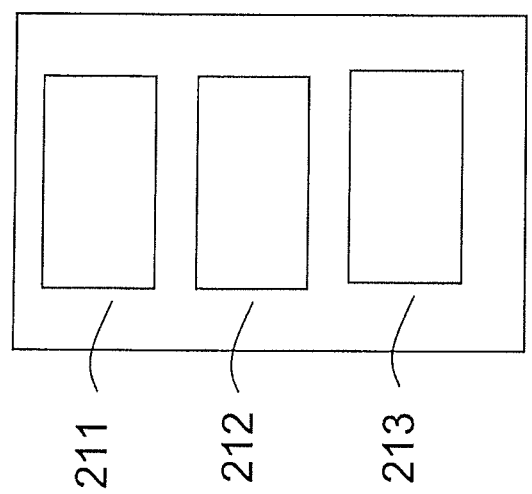
FIG. 3 illustrates a network node, e.g. a radio base station, according to the present invention.

FIG. 3 illustrates a network node 21, e.g. a radio base station, according to the present invention. The network node 21 is located in a communication system applying a time-division duplex transmission of time slots on a same frequency band for uplink and downlink transmissions to user equipments and support access to at least a first and a second co-existing radio access network. The network node 21 comprises means 211 for assigning to each time slot an attribute distinguishing transmission mode and direction of transmission in said time slot. According to further embodiments of the present invention, the network node 21 can also comprise means 212 for providing signalling information of subframes that are available for the user equipment 22 for uplink transmission and/or means 213 for performing a resource allocation for an uplink transmission by indicating the hopping sequence to be used for said transmission.

Figure 4:
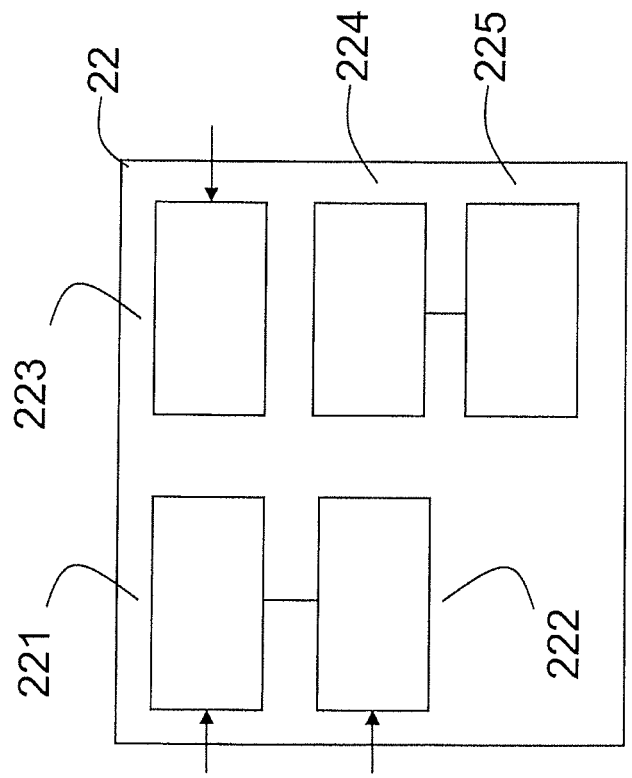
FIG. 4 illustrates a user equipment according to the present invention.

FIG. 4 illustrates a user equipment 22 according to the present invention, said user equipment connected to a network node 21 applying a time-division duplex transmission of time slots on the same frequency band for uplink and downlink transmissions to said user equipment 22. The network node 21 supports access to at least a first and a second co-existing radio access network, whereby said user equipment 22 has access via said first radio access network. The user equipment 22 comprises means 221 for retrieving information on an attribute assigned to the time slots of a received transmission from the network node 21 and means 222 for omitting time slots that are marked with a value prohibiting the usage of such time slots to user equipments accessing said network node 21 via the first radio access network. According to further embodiments of the present invention, the user equipment can further comprise means 223 for retrieving information signalled by the network node 21 of subframes that are available for the user equipment 22 for uplink transmission and/or means 224 for determining control channels in certain subframes by applying pre- or semi-statically configured information of said channels in a storage means 225 and deriving an indication of the resource allocation for uplink or downlink subframes by accounting said determined control channel information.

The invention claimed is:

1. A method in a single network node of a communication system applying data transmission in time slots on a same frequency band for uplink and downlink transmissions to and from a user equipment, said single network node supporting access to at least a first and a second co-existing radio access network, the method comprising:
   assigning, by the network node, to each time slot an attribute distinguishing transmission mode and direction of transmission in said time slot, wherein, for one or more time slots, said attribute comprises at least one value which marks, by the network node, the one or more time slots as discontinuous transmission and reception or inactive, to prohibit the usage of the one or more time slots to user equipments accessing said network node via the first radio access network and not to prohibit the usage of the one or more time slots to user equipments accessing said network node via the second radio access network,
   wherein the first radio access network is a Universal Mobile Telecommunications System (UMTS) Terrestrial Radio Access Network (UTRAN) and the second radio access network is a Evolved UTRAN (E-UTRAN), and
   wherein both the first and second co-existing radio access networks utilize a same carrier frequency.

2. The method according to claim 1, wherein said attribute comprises distinguishing values indicating uplink transmission, downlink transmission, or a discontinuous transmission and reception mode.

3. The method according to claim 1, wherein uplink time slots for uplink transmissions on the first radio access network are configured such as to avoid scheduling of transmissions on said first radio network on time slots assigned to said second radio access network.

4. The method according to claim 1, wherein said attribute comprises indications for one of downlink subframe, uplink subframe, or inactive subframe.

5. The method according to claim 4, further comprising signaling information of subframes that are available for uplink transmission to the user equipment.

6. The method according to claim 1, further comprising the step of performing a resource allocation for an uplink transmission by indicating the hopping sequence to be used for said transmission.

7. The method according to claim 1, wherein the first co-existing radio access network uses a first physical layer that applies a first type of multiplexing, and
   the second co-existing radio access network uses a second physical layer that applies a second type of multiplexing that is different from the first type of multiplexing.

8. The method according to claim 1, wherein the step of assigning comprises marking a time slot such that the user equipment should not listen to a downlink transmission, nor transmit an uplink transmission during the time slot.

9. A method in a user equipment connected to a network node of a communication network, said network node applying data transmission in time slots on a same frequency band for uplink and downlink transmissions to and from said network node, said network node supporting access to at least a first and a second co-existing radio access network, wherein said user equipment has access via said first radio access network, the method comprising:
   retrieving information on an attribute assigned to the time slots of a received transmission from the network node, wherein, for one or more time slots, said attribute comprises at least one value which marks, by the network node, the one or more time slots as discontinuous transmission and reception or inactive, to prohibit the usage of such time slots to user equipments accessing said network node via the first radio access network and not to prohibit the usage of the one or more time slots to user equipments accessing said network node via the second radio access network; and
   omitting the usage of the one or more time slots that are marked by the network node as discontinuous transmission and reception or inactive such as to prevent said user equipment from decoding or obeying to control signaling intended for transmissions on said second radio access network,
   wherein the first radio access network is a Universal Mobile Telecommunications System (UMTS) Terrestrial Radio Access Network (UTRAN) and the second radio access network is a Evolved UTRAN (E-UTRAN), and
   wherein both the first and second co-existing radio access networks utilize a same carrier frequency.

10. The method according to claim 9, further comprising retrieving information signaled by the network node of subframes that are available for uplink transmission to the user equipment.

11. The method according to claim 9, further comprising the steps of determining control channels in certain subframes by applying pre or semi-statically configured information of said channels; and deriving an indication of the resource allocation for uplink or downlink subframes by accounting said determined control channel information.

12. A network node in a communication system, the network node configured to:
   apply data transmission in time slots on a same frequency band for uplink and downlink transmissions to and from a user equipment;
   support access to at least a first and a second co-existing radio access network; and
   assign to each time slot an attribute distinguishing transmission mode and direction of transmission in said time slot, wherein, for one or more time slots, said attribute comprises at least one value which marks, by the network node, the one or more time slots as discontinuous transmission and reception or inactive, to prohibit the usage of the one or more time slots to user equipments accessing said network node via the first radio access network and not to prohibit the usage of the one or more time slots to user equipments accessing said network node via the second radio access network,
   wherein the first radio access network is a Universal Mobile Telecommunications System (UMTS) Terrestrial Radio Access Network (UTRAN) and the second radio access network is a Evolved UTRAN (E-UTRAN), and
   wherein both the first and second co-existing radio access networks utilize a same carrier frequency.

13. The network node according to claim 12, further configured to provide signaling information of subframes that are available for the user equipment for uplink transmission.

14. The network node according to claim 12, further configured to perform a resource allocation for an uplink transmission by indicating the hopping sequence to be used for said transmission.

15. A user equipment connected to a network node of a communication network, said network node applying data transmission in time slots on a same frequency band for uplink and downlink transmissions to and from said network node, said network node supporting access to at least a first and a second co-existing radio access network, wherein said user equipment has access via said first radio access network, and said user equipment is configured to:

retrieve information on an attribute assigned to the time slots of a received transmission from the network node, wherein, for one or more time slots, said attribute comprises at least one value which marks, by the network node, the one or more time slots as discontinuous transmission and reception or inactive, to prohibit the usage of the one or more time slots to user equipments accessing said network node via the first radio access network and not to prohibit the usage of the one or more time slots to user equipments accessing said network node via the second radio access network; and omit the one or more time slots that are marked with the value prohibiting the usage of such time slots to user equipments accessing said network node via the first radio access network, wherein the first radio access network is a Universal Mobile Telecommunications System (UMTS) Terrestrial Radio Access Network (UTRAN) and the second radio access network is a Evolved UTRAN (E-UTRAN), and wherein both the first and second co-existing radio access networks utilize a same carrier frequency.

16. The user equipment according to claim 15, further configured to retrieve information signaled by the network node of subframes that are available for the user equipment for uplink transmission.

17. The user equipment according to claim 15, further configured to determine control channels in certain subframes by applying pre- or semi-statically configured information of said channels in a storage and deriving an indication of the resource allocation for uplink or downlink subframes by accounting said determined control channel information.

\* \* \* \* \*